(12) United States Patent
Scharlemann et al.

(10) Patent No.: US 9,505,658 B2
(45) Date of Patent: Nov. 29, 2016

(54) METHOD FOR PROVIDING MODIFIED CEMENT COMPOSITIONS, DRY MORTARS AND CEMENT-FREE MIXTURES

(71) Applicant: Dow Global Technologies LLC, Midland, MI (US)

(72) Inventors: Sonja Scharlemann, Wedemark (DE); Joerg Neubauer, Hamburg (DE)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/362,963

(22) PCT Filed: Dec. 4, 2012

(86) PCT No.: PCT/US2012/067756
§ 371 (c)(1),
(2) Date: Jun. 5, 2014

(87) PCT Pub. No.: WO2013/085900
PCT Pub. Date: Jun. 13, 2013

(65) Prior Publication Data
US 2014/0336306 A1   Nov. 13, 2014

Related U.S. Application Data

(60) Provisional application No. 61/568,909, filed on Dec. 9, 2011.

(51) Int. Cl.
| | |
|---|---|
| C04B 28/04 | (2006.01) |
| C04B 28/02 | (2006.01) |
| C04B 40/00 | (2006.01) |
| C08L 1/28 | (2006.01) |
| C04B 22/00 | (2006.01) |
| C04B 24/14 | (2006.01) |
| C04B 111/00 | (2006.01) |

(52) U.S. Cl.
CPC .............. *C04B 28/04* (2013.01); *C04B 22/00* (2013.01); *C04B 24/14* (2013.01); *C04B 28/02* (2013.01); *C04B 40/0039* (2013.01); *C08L 1/28* (2013.01); *C08L 1/284* (2013.01); *C04B 2111/00637* (2013.01)

(58) Field of Classification Search
CPC ... C04B 24/383; C04B 28/02; C04B 14/104; C04B 40/0028; C04B 40/0039; C04B 2103/0057; C04B 22/00; C04B 28/04; C08L 1/28; C08L 89/06; C08L 25/10; C08L 31/04; C08L 1/284; C08K 3/346
See application file for complete search history.

(56) References Cited

U.S. PATENT DOCUMENTS

| | | | | |
|---|---|---|---|---|
| 3,897,577 | A * | 7/1975 | Hymes | .......................... 427/277 |
| 4,229,225 | A * | 10/1980 | Kraszewski | ........ C04B 14/4643 |
| | | | | 106/643 |
| 4,402,752 | A * | 9/1983 | Chesney, Jr. | .................. 106/720 |
| 5,096,490 | A * | 3/1992 | Burdick | ..................... 106/181.1 |
| 5,277,712 | A * | 1/1994 | McInnis | ......................... 106/774 |
| 6,576,698 | B1 | 6/2003 | Weitzel | |
| 8,349,960 | B2 | 1/2013 | Gaeberlein et al. | |
| 2002/0195025 | A1* | 12/2002 | Bacher | ................ C04B 24/2641 |
| | | | | 106/778 |
| 2003/0005861 | A1* | 1/2003 | Dietrich et al. | .............. 106/727 |
| 2005/0241539 | A1* | 11/2005 | Hagen | .................... B63H 3/008 |
| | | | | 106/805 |
| 2005/0241540 | A1 | 11/2005 | Hohn et al. | |
| 2005/0241541 | A1 | 11/2005 | Hohn et al. | |
| 2005/0241542 | A1 | 11/2005 | Hagen et al. | |
| 2005/0241543 | A1 | 11/2005 | Hagen et al. | |
| 2015/0122152 | A1* | 5/2015 | Neubauer | ............... C04B 28/14 |
| | | | | 106/652 |

FOREIGN PATENT DOCUMENTS

| | | | | |
|---|---|---|---|---|
| CN | 101734896 A | * | 6/2010 | .......... C04B 28/144 |
| DE | 19549441 A1 | | 4/1997 | |
| EP | 2551298 A1 | | 1/2013 | |
| FR | 2421153 A1 | * | 10/1979 | ............. C04B 28/14 |
| JP | 07089853 A | * | 4/1995 | |
| WO | 2008151878 A1 | | 12/2008 | |
| WO | 2011015508 A1 | | 2/2011 | |

OTHER PUBLICATIONS

JP 07089853 A, Apr. 1995, Derwent Ab.*
JP 07089853 A, Apr. 1995, Machine translation and partial human translation.*
CN 101734896 A, Jun. 2010, English Ab.*
FR 2421153 A1, Oct. 1979, Derwent Ab.*

* cited by examiner

*Primary Examiner* — Satya Sastri
(74) *Attorney, Agent, or Firm* — Andrew E. C. Merriam

(57) ABSTRACT

The present invention relates to methods for providing modified cement compositions having increased slip resistance and/or a decreased setting time in comparison to cement compositions comprising from 1 to 10 weight percent redispersible polymer powder (RDP) and water soluble cellulose ether in a specific amount from 0.1 to 1.0 weight percent, based on the total dry weight of said composition. Also provided are dry mortars comprising cement, RDP, water soluble cellulose ether and one or more additives selected from gelatin, bentonite and combinations thereof for use in such methods, and cement-free mixtures comprising water soluble cellulose ether and one or more additives selected from gelatin, bentonite and combinations thereof which may be added to cement binder for use a for use in such methods.

10 Claims, No Drawings

METHOD FOR PROVIDING MODIFIED CEMENT COMPOSITIONS, DRY MORTARS AND CEMENT-FREE MIXTURES

The present invention relates to a method for providing modified cement compositions having increased slip resistance and/or a reduced setting time in comparison to cement compositions comprising redispersible polymer powder (RDP) in an amount from 1.0 to 10 weight percent and water soluble cellulose ether in a specified amount from 0.1 to 1.0 weight percent, each based on the total dry weight of said composition. Also provided are dry mortars comprising cement, RDP, water soluble cellulose ether and an additive selected from gelatin, bentonite and combinations thereof for use in such methods, and cement-free mixtures comprising RDP, water soluble cellulose ether and gelatin and/or bentonite which may be added to cement and, optionally, aggregate materials for use in such methods.

BACKGROUND

Cement compositions are generally prepared at the point of use by combining cement mortars, i.e. dry mixtures comprising not less than 10 weight percent cement, based on the total dry weight of the mortar, with an amount of water sufficient to enable the application of the resultant cement composition to a surface prior to it setting and hardening upon drying. Such cement compositions can be used as adhesive compositions, in particular tile adhesive compositions, strongly holding two surfaces together once the setting process has completed.

Conventional cement compositions often comprise a combination of cement and one or more additives, such as sand, lime, dispersants, thickeners and plasticizers, which provide a modified cement composition with improved physical characteristics. In particular, the use of fine aggregate materials such as silica sand is well known. Further, wetting agents or water retention additives may be utilized to impart a beneficial effect upon the physical characteristics of the cement composition and/or the resultant hardened product, which are highly dependent upon both the initial hydration process and the subsequent water removal as the composition sets and hardens upon drying. For example, the incorporation of wetting agents or water retention additives may lead to increase in open time, setting rate and drying time.

The use of polysaccharide derivatives, in particular, water soluble cellulose ether compounds, as water retention additives in cement compositions is well known. For example, U.S. Pat. No. 4,402,752 discloses a dry-set mortar composition adapted to be mixed with water containing, in the dry state, sand, Portland cement and cellulose ether improved by the inclusion of anionic polyacrylamide and bentonite clay. There is no disclosure in this document of the use of a redispersible polymer powder in the compositions.

In addition to cellulose ether, cement compositions are known to contain other additives. For example US-A-2005/0241539 discloses a mixture composition for use in preparing tile cement compositions, wherein the resultant dry tile cement comprises from 0.1 to 2.0 weight percent alkylhydroxyalkyl cellulose and/or hydroxyalkyl cellulose prepared from raw cotton linters and 0.0001 to 15 weight percent of at least one additive. Included amongst a long list of specific additives generically disclosed in this document are redispersible polymer powders, gelatin and bentonite. However, this document fails to provide any disclosure of a single composition comprising a cellulose ether, a redispersible polymer powder and an additive selected from gelatin, bentonite and combinations thereof.

Redispersible polymer powders (RDP) made from emulsion polymers, such as vinyl acetate/ethylene copolymers, styrene/butadiene copolymers, and vinyl acetate/versatic acid vinyl ester copolymers are widely used in various construction applications, such as cement-containing tile adhesives (CBTA) to improve the mechanical properties such as tensile adhesive strength of the cementitious composition.

Whilst conventional cement dry mortars may typically contain a variety of additives in order to improve the physical characteristics of the resultant cement composition, either in the wet or dry hardened state, there remains a desire to obtain a reduction in setting time within RDP and cellulose ether containing cement compositions without causing any significant detrimental effects on the performance or properties of such compositions. In addition, there remains a desire to obtain an increase in slip resistance within RDP and cellulose ether containing cement compositions without causing any significant detrimental effects on the performance or properties of such compositions. In particular, it would be advantageous to obtain both a reduction in setting time and an increase in slip resistance without causing any significant detrimental effects on the performance of such compositions.

Statement of the Invention

The present invention in its various aspects is as set out in the accompanying claims.

According to a first aspect, the present invention provides a method for providing a modified cement composition having a increased slip resistance in comparison to a cement composition comprising from 1 to 10 weight percent redispersible polymer powder and water soluble cellulose ether in a specified amount X, wherein the specified amount is from 0.1 to 1.0 weight percent, said method comprising: a) forming a dry mortar comprising: i) cement; ii) from 1 to 10 weight percent redispersible polymer powder; iii) water soluble cellulose ether in an amount of X minus Y; and iv) one or more additives selected from gelatin, bentonite and combinations thereof in a total amount Y, wherein Y is from 0.02X to 0.30X; and b) combining said dry mortar with water to form a modified cement composition, wherein all weights are based upon the dry weight of said cement composition.

According to a second aspect, the present invention provides a method for providing a modified cement composition having a decreased setting time in comparison to a cement composition comprising from 1 to 10 weight percent redispersible polymer powder and water soluble cellulose ether in a specified amount X, wherein the specified amount is from 0.1 to 1.0 weight percent, said method comprising: a) forming a dry mortar comprising: i) cement; ii) from 1 to 10 weight percent redispersible polymer powder; iii) water soluble cellulose ether in an amount of X minus Y; and iv) one or more additives selected from gelatin, bentonite and combinations thereof in a total amount Y, wherein Y is from 0.02X to 0.30X; and b) combining said dry mortar with water to form a modified cement composition, wherein all weights are based upon the dry weight of said cement composition.

According to a third aspect, the present invention provides a dry mortar comprising cement, from 1 to 10 weight percent redispersible polymer powder, water soluble cellulose ether, and one or more additives selected from gelatin, bentonite and combinations thereof, for use in the first and/or second aspects of the present invention, wherein said mixture comprises 0.1 to 1.0 weight percent, based on the total weight of said dry mortar, of a mixture consisting of water-soluble cellulose ether and gelatin, and wherein the weight ratio of cellulose ether to gelatin is from 49:1 to 7:3.

According to a fourth aspect, the present invention provides a cement-free mixture comprising water soluble cellulose ether and one or more additives selected from gelatin, bentonite and combinations thereof, which may be added to cement, for use in the first and/or second aspects of the present invention, wherein the weight ratio of cellulose ether to gelatin is from 49:1 to 7:3.

Cement compositions prepared according to the present invention demonstrate relatively reduced setting time or increased slip resistance without any significant detrimental effects on the performance or properties of the composition. In particular, the cement compositions prepared according to the present invention do not demonstrate any significant reduction in either i) open time, i.e. time dependent water retention within the cement, or ii) tensile adhesive strength following storage of mortar. In this regard, it is believed that any significant reduction in tensile adhesive strength could indicate a reduction in storage stability. Preferably, the compositions prepared according to the present invention demonstrate both a relative reduction in setting time and an increased slip resistance without any significant detrimental effects on the performance or properties of the composition.

DETAILED DESCRIPTION OF THE INVENTION

Throughout the specification, any reference to percent or percent weight etc are expressed in terms of dry weight of the cement composition unless otherwise specified.

It has been discovered surprisingly that slip resistance is increased and/or setting time is decreased in cement compositions comprising redispersible polymer powder when 2 to 30 weight percent of an amount of water soluble cellulose ether normally added to the composition to provide desirable properties such as high water retention, is substituted with one or more additives selected from gelatin, bentonite and combinations thereof without causing a significant detrimental effect on said desirable properties, provided that the total amount of water soluble cellulose ether, gelatin and bentonite included within said composition is from 0.1 to 1.0 weight percent, based on the total dry weight of said composition components. Preferably, the total amount of water soluble cellulose ether, gelatin and bentonite included within said composition is from 0.1 to 0.5 weight percent, even more preferably from 0.15 to 0.4 weight percent, based on the total dry weight of said composition components. Such preferred amounts of cellulose ether and additive are believed to enable a slight decrease in the amount of water without a significant loss in workability performance.

In the present invention, a mix of water soluble cellulose ether and one more additives selected from gelatin, bentonite and combinations thereof is present in a weight ratio of 7:3 to 49:1. In particularly preferred embodiments, the additive is gelatin. Preferably, the cellulose ether and additive(s) are present in a weight ratio of greater than or equal to 4:1, more preferably greater than or equal to 9:1. At the same time, the cellulose ether and additive(s) are preferably present in a weight ratio of less than or equal to 97:3, more preferably less than or equal to 19:1.

In the first and second embodiments of the present invention, a dry mortar is formed comprising cement, from 1 to 10 weight percent redispersible polymer powder, water soluble cellulose ether in an amount of X minus Y, and one or more additives selected from gelatin, bentonite and combinations thereof in a total amount Y, all amounts being percent weights based on the total dry weight of said dry mortar, wherein Y is from 0.02X to 0.30X. Preferably, Y is greater than or equal to 0.03X, more preferably greater than or equal to 0.05X. At the same time, Y is preferably less than or equal to 0.2X, more preferably less than or equal to 0.1X. Accordingly, the total amount of water soluble cellulose ether and one or more additives selected from gelatin, bentonite and combinations thereof in the dry mortar is in the range 0.1 to 1.0, preferably 0.1 to 0.5, and more preferably 0.15 to 0.4, weight percent based upon the total dry weight of the cement composition, and the weight ratio of cellulose ether to gelatine, bentonite and/or mixtures thereof will range from 49:1 to 7:3, preferably 97:3 to 4:1, and more preferably 19:1 to 9:1.

Any conventional cement is believed to be suitable for use in the present invention. In preferred embodiments, the cement is selected from the group consisting of Portland cement, Portland-slag cement, Portland-silica fume cement, Portland-pozzolana cement, Portland-burnt shale cement, blastfurnace cement, pozzolana cement, composite cement, calcium aluminate cement and combinations thereof. More preferably the cement is Portland cement. In preferred embodiments, the compositions comprise cement in an amount not less than 10 weight percent, more preferably not less than 20 weight percent, and even more preferably not less than 30 weight percent. At the same time, it is preferred that the compositions comprise no more than 60 weight percent, more preferably no more than 50 weight percent and even more preferably no more than 40 weight percent cement.

In the first, second and thirds aspects of the present invention, the compositions comprise from 1 to 10 weight percent redispersible polymer powder (RDP). A wide variety of RDPs are well known in the art and are available from commercial sources, and all of which are believed to be suitable for use in the present invention. However, in preferred embodiments, the compositions comprise a RDP which comprises a vinyl acetate homopolymer, a vinyl acetate-ethylene copolymer, a styrene-butadiene copolymer or mixtures thereof. In more preferred embodiments, the RDP comprises a vinyl acetate-ethylene copolymer. In equally preferred alternative embodiments, the RDP comprises a styrene-butadiene copolymer. In preferred embodiments, the compositions comprise at least 1.5 weight percent, more preferably at least 2 weight percent RDP. At the same time, the compositions comprise no more than 8 weight percent, more preferably no more than 5 weight percent RDP.

Any cellulose ether that is soluble in water at 20° C. is believed to be suitable for use in the present invention. In such compounds, the hydroxyl groups present in cellulose may be partially or fully replaced by —OR groups, wherein R is selected from a ($C_1$-$C_6$) alkyl group, a hydroxyalkyl ($C_1$-$C_6$)alkyl group and mixtures thereof. The presence of an alkyl substitution in cellulose ether is conventionally described by the DS, i.e. the average number of substituted OH groups per anhydroglucose unit. For example, a methyl substitution is specified as DS (methyl) or DS (M). Similarly, the presence of a hydroxyalkyl substitution is conventionally described by the MS, i.e. the average number of moles of the esterification reagent which are bound in an ether-like manner per mole of anhydroglucose units. For example, the etherification with the ethylene oxide is stated as MS (hydroxyethyl) or MS (HE) and the etherification with propylene oxide as MS (hydroxypropyl) or MS (HP). The determination of the DS and MS is effected by the Zeisel method which is described, for example, in P. W. Morgan, *Ind. Eng. Chem. Anal. Ed.* 18 (1946) 500-504, and R. U. Lemieux, C. B. Purves, *Can. J. Res. Sect. B* 25 (1947) 485-489.

The cellulose ethers suitable for use in the present invention may be prepared by conventional methods known in the art. Typically, the production process comprises the step of activating the cellulose, for example by treatment with an alkali metal hydroxide, before reacting the activated cellulose with etherifying agent(s) and washing the resultant cellulose ether in water or other washing liquors such as isopropanol, acetone, methylethylketone or brine to remove by-products. Following the washing step, the cellulose ether, which may be in the form of granules, lumps and/or paste, is separated from the washing liquor by any conventional method, e.g. centrifugation, and typically has a moisture content of from 30 to 60 percent based on the total weight of the moist cellulose ether. The moist cellulose ether is then subjected to drying and grinding, which may be carried out simultaneously in a single process step conventionally referred to as dry-grinding.

The water soluble cellulose ether is preferably an alkyl-hydroxyalkylcellulose, a hydroxyalkyl cellulose or an alkyl cellulose, or a mixture of such cellulose ethers. Examples of cellulose ether compounds suitable for use in the present invention include, for example, methylcellulose (MC), methylhydroxyethylcellulose (MHEC), methylhydroxypropylcellulose (MHPC), hydroxyethylcellulose (HEC), ethylhydroxyethylcellulose (EHEC), methylethylhydroxyethylcellulose (MEHEC), hydrophobically modified ethylhydroxyethylcelluloses (HMEHEC), hydrophobically modified hydroxyethylcelluloses (HMHEC), sulfoethyl methylhydroxyethylcelluloses (SEMHEC), sulfoethyl methylhydroxypropylcelluloses (SEMHPC), and sulfoethyl hydroxyethylcelluloses (SEHEC). All these compounds are well known.

Preferably, the water soluble cellulose ether is an alkyl-hydroxyalkylcellulose, i.e. a compound wherein hydroxyl groups on the cellulose are partially or fully replaced by —OR groups, wherein R represents a ($C_1$-$C_6$) alkyl group, a hydroxy($C_1$-$C_6$)alkyl group and mixtures thereof because substituents having alkyl chains of greater than 6 carbons in length tend to impart sufficient hydrophobicity to the cellulose ether to render the compound insoluble or only slightly soluble in water. Preferably, the ($C_1$-$C_6$) alkyl group is a ($C_1$-$C_2$) alkyl group. Preferably, the hydroxy($C_1$-$C_6$)alkyl group is a hydroxy($C_2$-$C_3$)alkyl group. More preferably, the cellulose ether is selected from methyl hydroxyethylcellulose (MHEC), an ethyl hydroxyethylcellulose (EHEC), a methyl hydroxypropylcellulose (MHPC), a methylethyl hydroxyethylcellulose (MEHEC), a methyl hydroxyethylhydroxypropylcellulose (MHEHPC) and mixtures thereof. Most preferably, the cellulose ether is selected from MHEC and MHPC.

Although the viscosity grade of the cellulose ether used in the present invention is not considered to be a critical factor in providing a reduction in agglomeration, it is believed that, in the absence of gelatin, there is an increased tendency to form agglomerate structures as the viscosity grade is increased. The viscosity grade of the cellulose ether, measured as a 2% aqueous solution at 20° C. using an Ubbelohde tube viscometer, is preferably greater than or equal to 1,000 mPa s, more preferably greater than or equal to 2,000 mPa s. At the same time, the viscosity grade is preferably less than or equal to 500,000 mPa s, more preferably less than or equal to 300,000 mPa s.

The modified dry mortar, and cement compositions of the present invention comprise cement, redispersible polymer powder, water soluble cellulose ether and one or more additives selected from gelatin, bentonite and combinations thereof. These mortar and cement compositions all contain cement in an amount not less than 10 weight percent, preferably at least 20 weight percent, more preferably at least 40 weight percent and even more preferably at least 60 weight percent, based on the total dry weight of their components. In addition to cement, cellulose ether and one or more additives selected from gelatin, bentonite and combinations thereof, the dry mortar, plaster and filler compositions of the present invention may comprise one or more conventional additives selected from organic or inorganic thickening agents and/or secondary water retention agents, anti-sag agents, air entraining agents, wetting agents, defoamers, superplasticizers, dispersants, calcium complexing agents, retarders, accelerators, water repellents, biopolymers and fibres, all of which are well known in the art and are available from commercial sources. Such additional additives may also be mixed with the cement-free mixture of the present invention.

In preferred embodiments of the present invention, the modified cement composition comprises no less than 10 weight percent of one or more aggregate materials. Preferably, the aggregate materials have a particle size of no more than 1.0 mm. Preferably, the aggregate materials are selected from silica sand, dolomite, limestone, perlite, expanded polystyrene, hollow glass spheres, rubber crumbs and fly ash. More preferably, the aggregate materials is a silica sand. In embodiments in which aggregate materials are included within the dry mortars, it is preferred that the modified cement composition comprises no less than 20 weight percent, more preferably no less than 40 weight percent and most preferably no less than 50 weight percent of such material. At the same time, it is preferred that the modified cement composition comprises no more than 90 weight percent and more preferably no more than 80 weight percent of such material.

Some embodiments of the invention shall now be further described by way of exemplification only. All ratios, parts and percentages are expressed by dry weight unless otherwise specified, and all components are of good commercial quality unless otherwise specified. Abbreviations used in the Examples and Tables are listed below alongside their corresponding descriptions:

MHEC: hydroxyethyl methylcellulose commercially available from Dow Wolff Cellulosics GmbH as WALOCEL™ MKX 40000 PF 01

Cement: Portland cement (CEM I 42.5 R) commercially available from Holcim (Germany) AG, production plant Lagerdorf, as Holcim-Pur 4™

F32 Sand: F32 quartz sand commercially available from Quarzwerke GmbH, Frechen plant F36 Sand: F36 quartz sand commercially available from Quarzwerke GmbH, Frechen plant VAE: Redispersible polymer powder containing a vinyl acetate-ethylene copolymer commercially available from the Dow Chemical Company as DLP 2000

SB: Redispersible polymer powder containing a styrene-butadiene copolymer, formed by polymerization of a monomer mix comprising 62 parts by wt styrene, 35 parts by wt butadiene and 3 parts by wt itaconic acid.

Gelatin: semi-granular gelatin powder commercially available from Caesar & Loretz GmbH Bentonite: Bentone GS commercially available from Elementis Specialties, Inc.

EXAMPLES

The improvement in slip resistance and setting time of cement compositions comprising redispersible polymer powders upon substitution of a specific amount of water soluble cellulose ether with a combination of cellulose ether and either gelatin or bentonite was demonstrated by testing various cement compositions comprising varying amounts of MHEC in combination with Gelatin or Bentonite in the presence of either VAE or SB.

Mortar Preparation

Throughout the following examples, Cement was combined with F36 Sand, F32 Sand, MHEC and, where required, VAE, SB, Gelatin and/or Bentonite in a 3 liter polyethylene bag which was subsequently sealed and manually shaken for a period of three minutes in order to form homogenous dry mortars.

Cement Composition Preparation

Throughout the examples, the required quantity of each cement composition was prepared by combining a measured amount of the homogenous dry mortar with a measured amount of water and mixing by hand. The exact mixing procedure for each test is detailed below. However, in each case, the water-solids-factor $$\left(\text{"}\frac{W}{S}\text{"}\right)$$

was calculated as follows:

$$\frac{W}{S} = \frac{\text{initial quantity of water (g)}}{\text{quantity of modified dry mortar (g)}}$$

Evaluation of Setting Time

The overall setting time of various cement compositions were determined using an automated Penetrometer (Dettki AVM-14-PNS), supplied by Dettki Messautomatisierung, 78736 Epfendorf/Germany. At the commencement of each test, cement compositions were prepared by pouring the required amount of water into a mixing vessel before gradually adding 400 g of the homogenous dry mortar and stirring by hand for 1 minute. Upon completion of the mixing process, the cement composition was then transferred into a polystyrene cup having an internal diameter of 93 mm and a height of 38 mm, taking care to avoid entrapping air within the composition, and the filled cup is then placed on a vibrating table to compress the mixture. Once the mixture has been subjected to 15 cycles of the compressive force, a smooth horizontal surface is then prepared in the cement composition by scraping away any excess cement composition using a spatula in a sawing motion. A border comprising 5 mm deep layer of cement composition is then applied to the outer circumference of the smoothed surface to provide a liquid tight seal, and a layer of liquid paraffin is placed above the smooth cement composition surface to suppress skin formation and prevent the cement composition from sticking to the testing needle during analysis. The samples are then placed into the penetrometer for automated analysis, with setting times being calculated from a notional start point at which mixing was initiated. During the testing procedure, the time at which needle penetration is limited to a depth 36 mm is recorded as the setting "start" time with the time at which the needle penetration is limited to a depth of 2 mm being recorded as the setting "end" time. By simple subtraction of the recorded start value from the recorded end value, a setting duration is calculated.

Evaluation of Slip Resistance

In each test, slip resistance, i.e. the tendency for a stoneware tile, adhered to a substrate via a wet cement composition, to slip when vertically orientated, was measured as follows: At the commencement of each test, cement compositions were prepared by adding 100 g of the dry mortar composition to a 200 ml stirring beaker before adding the required amount of water. The contents of the beaker were then stirred by hand for two periods of 1 minute separated by an intermediate resting period of 3 minutes. The composition was then again allowed to rest, this time for 4.5 minutes before being subjected to a final stir for 0.5 minutes. Upon completion of the mixing process, the cement composition is applied and combed onto the surface of a horizontally orientated non-absorbent PVC substrate using a 4×4 mm notched trowel angled at 60° to horizontal. A 200 g, stoneware tile (10×10 cm) conforming to EN 14411 is then placed into the cement composition with the smooth side facing the cement and a 3 kg weight is then placed on top of the tile for 30 seconds. The weight is then removed and the PVC substrate is raised into the vertical position. After 30 seconds have elapsed, slip distance, i.e. the vertical distance moved by the tile, is recorded. Then, as an additional test, a number of weights are added to the tile in stepwise fashion (50 g steps) until further tile slippage, as evidenced by a slippage of greater than 0.1 mm within 3 seconds, is observed. The original weight of the tile (200 g) plus the total additional weight (including that of any device for holding said weights in place) is then put into relation to the total bonded area in order to calculate a maximum safe tile weight, which is calculated as follows:

$$\text{max. } TW = \frac{TW + AW - SF}{ST}$$

wherein:
max.TW=maximum safe tile weight (g/cm$^2$);
TW=tile weight (g);
AW=additional weight (g);
SF=security factor of 100 g; and
ST=tile size (cm$^2$)

Evaluation of Open Time

In each test, open time, i.e. the length of time within which the back of a tile can still be effectively wetted when laid in a combed bed of cement composition, was measured as follows:

At the commencement of each test, cement compositions were prepared by adding 100 g of the dry mortar composition to a 200 ml stirring beaker before adding the required amount of water. The contents of the beaker were then stirred by hand for two periods of 1 minute separated by intermediate resting period of 3 minutes. Upon completion of the mixing process, the cement composition is applied and combed onto a horizontally orientated 40×20 cm fibre-reinforced cement board using a 4×4 mm notched trowel angled at 60° to horizontal. The combed composition is then left to air dry for a period of 5 minutes before a tile (a 5×5 cm Earthenware tile with a water absorbing capacity of 15±3% in accordance with EN 14411) is placed into the cement composition and a 3 kg weight is placed on top of the tile for 30 seconds to ensure adequate tile-cement contact. Up to five subsequent tiles may then be placed into the cement composition in an analogous fashion at 5 minute intervals. 40 minutes after the composition was applied to the cement board, each tile is then removed from the cement and placed faced down on a surface for analysis. The degree of wetting of the rear of each tile is estimated as a percentage of the entire surface area with the aid of a 5×5 cm square template, which is divided into 100 equal sized squares. By counting the total number of squares in which the tile is wet, open time, expressed as a percentage, can be estimated. To minimise the effect of experimental fluctuation, the total number of observed wet squares is rounded by ±5.

Evaluation of Tensile Adhesive Strength

Tensile adhesive strength of the various cementitious adhesive compositions was determined according to European Standard EN 1348:2007-11.

Example 1

In order to demonstrate the effect of water soluble cellulose ethers, redispersible polymer powders, gelatin and/or bentonite addition upon cement compositions, seven formulations were prepared as shown below in Table 1. In each formulation, a modified dry mortar composition was prepared by combining 450 g (30 wt %) Cement, 406.5 g (27.1 wt %) F32 Sand, 600 g (40 wt %) F36 Sand and, where required, 37.5 g (2.5%) VAE or SB together with either 6.0 g (0.4 wt %) of MHEC or 6.0 g (0.4 wt %) of a mixture of MHEC and Gelatin or Bentonite.

TABLE 1

| Example | MHEC % | VAE % | SB % | Gelatin % | Bentonite % | W/S |
|---|---|---|---|---|---|---|
| 1.1 (Comparative) | 0.4 | — | — | — | — | 0.24 |
| 1.2 (Comparative) | 0.4 | 2.5 | — | — | — | 0.23 |
| 1.3 | 0.36 | 2.5 | — | 0.04 | — | 0.22 |
| 1.4 | 0.36 | 2.5 | — | — | 0.04 | 0.22 |
| 1.5 (Comparative) | 0.4 | — | 2.5 | — | — | 0.23 |
| 1.6 | 0.36 | — | 2.5 | 0.04 | — | 0.22 |
| 1.7 | 0.36 | — | 2.5 | — | 0.04 | 0.22 |

Slip resistance and setting time tests as detailed above were conducted on each of Formulations 1.1 to 1.7, the results of which are shown below in Table 2.

TABLE 2

| | Slip Resistance | | Setting Time (min) | | |
|---|---|---|---|---|---|
| Example | Slip distance (mm) | Maximum tile weight (g/mm$^2$) | Start | End | Duration |
| 1.1 | 0.8 | 2.0 | 759 | 907 | 148 |
| 1.2 | 0.7 | 2.5 | 757 | 929 | 172 |
| 1.3 | 0.5 | 2.5 | 733 | 896 | 163 |
| 1.4 | 0.7 | 2.5 | 762 | 923 | 161 |
| 1.5 | 0.7 | 2.5 | 910 | 1138 | 228 |
| 1.6 | 0.5 | 3.0 | 882 | 1094 | 212 |
| 1.7 | 0.5 | 3.0 | 882 | 1067 | 185 |

It is evident upon comparison of Example 1.1 with Examples 1.2 and 1.5 that although slip resistance may be increased by the incorporation of 2.5 weight percent VAE or SB, incorporation of such redispersible polymer powders adversely affect the overall setting time of the resultant compositions. Indeed, it is noted that the overall setting time increased by more than 25% as a consequence of the incorporation of SB.

Further, it is evident upon comparison of Example 1.2, which contains 0.4 wt % cellulose ether, with Example 1.3, in which 10% of the cellulose ether included in Example 1.2 has been substituted with Gelatin, that such substitution has a beneficial effect upon both slip resistance and setting time. Such beneficial effects are also observed upon comparison of Example 1.5 with Example 1.6, which demonstrates that the benefits are obtained for compositions comprising the vinyl acetate-ethylene containing RDP and the styrene-butadiene containing RDP.

Furthermore, comparison of Example 1.2 with 1.4 and Example 1.5 with 1.7 demonstrates that similar beneficial effects are obtained upon substitution of 10% of cellulose ether with Bentonite. However, it is noted that such Bentonite substitution had no measurable effect on the slip resistance of the resultant vinyl acetate-ethylene RDP-containing cement composition.

Additionally, open time and tensile adhesive strength tests as detailed above were conducted on each Formulation, the results of which are shown in Tables 3 and 4 respectively. In the tests, adequate tile wetting is obtained at open time levels of greater than or equal to 50%, preferably greater than or equal to 60% and, in order to be suitable for use as a tile adhesive, the cement composition should retain adequate wetting for a period of at least 20 minutes, and preferably for a period of 25 minutes.

TABLE 3

| | Open time (%) | | | | |
|---|---|---|---|---|---|
| Example | 5 min | 10 min | 15 min | 20 min | 25 min |
| 1.1 | 100 | 95 | 90 | 75 | 25 |
| 1.2 | 100 | 95 | 90 | 85 | 70 |
| 1.3 | 100 | 95 | 90 | 80 | 60 |
| 1.4 | 100 | 95 | 85 | 55 | 10 |
| 1.5 | 100 | 95 | 85 | 60 | 35 |
| 1.6 | 100 | 95 | 85 | 65 | 40 |
| 1.7 | 100 | 100 | 85 | 50 | 25 |

It is evident upon comparison of Example 1.1 with Examples 1.2 and 1.5, in particular the values obtained after 25 minutes, that an increase in open time is observed upon the incorporation of 2.5 weight percent VAE or SB. However, it is noted that the beneficial effect is far more pronounced in the VAE-containing composition than in the SB-containing composition. Indeed, it is noted that the VAE-containing composition not only demonstrated an enhanced open time after 20 minutes, but also retained a wetting ability significantly above that believed to be required for adequate tile wetting after 25 minutes, whereas the wetting ability of Example 1.1, which contains no RDP, had fallen well below the nominal threshold of 50%.

Further, it is evident upon comparison of Example 1.2, which contains 0.4 wt % cellulose ether, with Example 1.3, in which 10% of the cellulose ether included in Example 1.2 has been substituted with Gelatin, that such substitution does not have a significant detrimental effect upon open time. In this regard, and although the 20 and 25 minute values decreased slightly as a result of such Gelatin substitution, the value obtained remained significantly above the 50% nominal threshold and, consequently, was considered to retain an adequate tile wetting ability after 25 minutes. Similarly, comparison of Example 1.5 with 1.6 indicates that a beneficial effect may be obtained in compositions comprising styrene-butadiene containing RDPs.

Furthermore, it is evident upon comparison of Example 1.2 with 1.4 and Example 1.5 with 1.7 that compositions in which 10% of the cellulose ether is substituted with Bentonite all provided adequate wetting ability after 20 minutes. However, it is noted that such Bentonite substitution appeared to cause a significant drop in wetting ability after 25 minutes, with the effect being most pronounced in compositions comprising vinyl acetate-ethylene containing RDPs.

TABLE 4

| | Tensile adhesive strength (N/mm$^2$) | | | |
|---|---|---|---|---|
| Example | 7 day NC | 28 day NC | Water | Warm |
| 1.1 | 0.82 | 0.73 | 0.82 | 0.17 |
| 1.2 | 1.12 | 1.11 | 0.71 | 0.91 |
| 1.3 | 1.11 | 1.14 | 0.71 | 0.96 |
| 1.4 | 1.12 | 1.16 | 0.71 | 1.07 |
| 1.5 | 0.84 | 0.88 | 0.67 | 0.84 |
| 1.6 | 0.82 | 0.85 | 0.56 | 0.71 |
| 1.7 | 0.84 | 0.82 | 0.65 | 0.73 |

The data in Table 4 indicates that an increase in tensile strength is obtained upon the incorporation of RDPs, in particular vinyl acetate-ethylene containing RDPs, following storage under standard, warm or water conditions. Consequently, it is believed that the incorporation of such RDPs improve product stability. In addition, the data indicates that no significant detrimental effect upon stability was observed in compositions comprising a mixture of MHEC and Gelatin or Bentonite. Indeed, direct comparison of Example 1.2, which comprises 0.4 weight percent MHEC, with Examples 1.3 and 1.4, which comprise 0.36 weight percent MHEC and 0.04 Gelatin or Bentonite suggest that such substitutions may in fact result in an increase in product stability.

Example 2

Further test results demonstrating the effect of MHEC and gelatin additives upon setting time of cement compositions comprising RDPs are shown below in Table 5. In Formulations 2.1, 2.3 and 2.5, modified dry mortar compositions were prepared comprising 30 weight percent Cement, 40 weight percent F36 Sand, 27.2 weight percent F32 Sand, 2.5 weight percent VAE and 0.3 weight percent of either MHEC or a mixture of MHEC and Gelatin. Furthermore, Formulations 2.2 and 2.4 were prepared by the additional incorporation of 0.015 or 0.03 weight percent Gelatin to the composition of Formulation 2.1

TABLE 5

| Example | MHEC % | Gelatin % | W/S | Setting Time (min) | | |
|---|---|---|---|---|---|---|
| | | | | Start | End | Duration |
| 2.1 (Comparative) | 0.3 | — | 0.195 | 576 | 692 | 116 |
| 2.2 (Comparative) | 0.3 | 0.015 | 0.195 | 603 | 691 | 88 |
| 2.3 | 0.285 | 0.015 | 0.190 | 573 | 657 | 84 |

TABLE 5-continued

| Example | MHEC % | Gelatin % | W/S | Setting Time (min) | | |
|---|---|---|---|---|---|---|
| | | | | Start | End | Duration |
| 2.4 (Comparative) | 0.3 | 0.03 | 0.190 | 603 | 702 | 99 |
| 2.5 | 0.27 | 0.03 | 0.190 | 576 | 670 | 94 |

Similar to Example 1, it is evident upon comparison of Example 2.1, which contains 0.3 wt % cellulose ether, with Examples 2.3 and 2.5, in which 5 or 10% of the cellulose ether included in Example 2.1 has been substituted with Gelatin, that such substitution has a beneficial effect upon overall setting time. Furthermore, it is noted that the largest reduction in overall setting time was achieved by Example 2.3, in which 5% of the cellulose ether of Example 2.1 had been substituted with Gelatin.

However, comparison of Example 2.1 with Examples 2.2 and 2.4, which each incorporated Gelatin in an amount additive to the cellulose ether included in Example 2.1, demonstrates that the reduction in setting time observed in Examples 2.3 and 2.5 was not demonstrated when Gelatin is incorporated into a dry mortar in addition to the desired amount of cellulose ether.

Additionally, tensile adhesive strength tests as detailed above were conducted on each Formulation, the results of which are shown in Table 6 below.

TABLE 6

| | Tensile adhesive strength (N/mm$^2$) | | |
|---|---|---|---|
| Example | 28 day NC | Water | Warm |
| 2.1 | 0.85 | 0.54 | 0.52 |
| 2.2 | 0.85 | 0.53 | 0.55 |
| 2.3 | 0.92 | 0.57 | 0.56 |
| 2.4 | 0.98 | 0.57 | 0.48 |
| 2.5 | 0.96 | 0.57 | 0.78 |

The data in Table 4 indicates that product stability is not adversely affected following storage under standard, warm or water conditions by the substitution, or indeed addition, of 5 or 10% of MHEC included in a control composition with Gelatin. Indeed, comparison of Example 2.1 with 2.2 to 2.5 suggests that such incorporation of Gelatin may in fact result in a slight increase in product stability, with those compositions in which a portion of MHEC has been substituted with Gelatin demonstrating the largest improvement.

The invention claimed is:

1. A method for providing a modified cement composition to improve its slip resistance, said method comprising:
   a) forming a dry mortar composition comprising:
      i. cement;
      ii. from 1 to 10 weight percent redispersible polymer powder;
      iii. water soluble cellulose ether in an amount of X minus Y, wherein X is from 0.1 to 1.0 weight percent of the composition; and
      iv. gelatin, in a total amount Y, wherein Y is from 0.02X to 0.30X; and
   b) combining said dry mortar with water to form a modified cement composition; wherein all weights are based upon the total dry weight of said cement composition.

2. A method for providing a modified cement composition to improve its setting time, said method comprising:
   a) forming a dry mortar composition comprising:
   i. cement;
   ii. from 1 to 10 weight percent redispersible polymer powder;
   iii. water soluble cellulose ether in an amount of X minus Y, wherein X is from 0.1 to 1.0 weight percent of the composition; and
   iv. gelatin in a total amount Y, wherein Y is from 0.02X to 0.30X; and
   b) combining said dry mortar with water to form a modified cement composition; wherein all weights are based upon the total dry weight of said cement composition.

3. The method according to claim 1, wherein said cement is selected from the group consisting of Portland cement, Portland-slag cement, Portland-silica fume cement, Portland-pozzolan cement, Portland-burnt shale cement, blast furnace cement, pozzolan cement, composite cement, calcium aluminate cement and combinations thereof.

4. The method according to claim 1, wherein said cement is present in an amount not less than 10 weight percent.

5. The method according to claim 1, wherein said redispersible polymer powder comprises a vinyl acetate homopolymer, a vinyl acetate-ethylene copolymer, a styrene-butadiene copolymer or mixtures thereof.

6. A method according to claim 1, wherein said water soluble cellulose ether is an alkylhydroxyalkylcellulose, a hydroxyalkyl cellulose, an alkyl cellulose or a mixture thereof.

7. The method according to claim 1, wherein said cellulose ether has a viscosity grade of from 1000 to 500,000 mPas, measured as a 2% aqueous solution at 20° C. using an Ubbelohde tube viscometer.

8. The method according to claim 1, wherein the total amount of cellulose ether and gelatin present in said modified cement composition is from 0.1 to 0.5 weight percent, based on the total dry weight of said composition.

9. The method according to claim 1, wherein Y is from 0.05X to 0.10X.

10. The method according to claim 1, wherein said dry mortar further comprises not less than 10 weight percent of one or more aggregate materials.

* * * * *